United States Patent
Holter et al.

(10) Patent No.: US 6,638,005 B2
(45) Date of Patent: Oct. 28, 2003

(54) COAXIAL WIND TURBINE APPARATUS HAVING A CLOSEABLE AIR INLET OPENING

(76) Inventors: John W. Holter, 5747 Lake Victoria Dr., Lakeland, FL (US) 33813; Eric G. Holter, 5747 Lake Victoria Dr., Lakeland, FL (US) 33813

( * ) Notice: Subject to any disclaimer, the term of this patent is extended or adjusted under 35 U.S.C. 154(b) by 38 days.

(21) Appl. No.: 10/053,745

(22) Filed: Jan. 17, 2002

(65) Prior Publication Data

US 2003/0133782 A1 Jul. 17, 2003

(51) Int. Cl.⁷ .................................................. F03D 7/06
(52) U.S. Cl. ........................ 415/4.2; 415/53.2; 415/151; 415/907
(58) Field of Search ........................... 415/2.1, 4.1, 4.2, 415/4.4, 53.2, 53.3, 145, 151, 905, 907; 290/55

(56) References Cited

U.S. PATENT DOCUMENTS

| | | | | | |
|---|---|---|---|---|---|
| 969,587 | A | * | 9/1910 | Williams | 415/4.3 |
| 1,471,095 | A | * | 10/1923 | Bonetto | 415/4.4 |
| 1,646,723 | A | * | 10/1927 | Bonetto | 415/4.2 |
| 1,935,097 | A | * | 11/1933 | Nelson | 415/4.2 |
| 4,127,356 | A | * | 11/1978 | Murphy | 415/4.1 |
| 5,332,354 | A | * | 7/1994 | Lamont | 415/4.2 |

* cited by examiner

Primary Examiner—Edward K. Look
Assistant Examiner—Dwayne J. White
(74) Attorney, Agent, or Firm—George A. Bode; Lisa D. Velez; Bode & Associates

(57) ABSTRACT

A coaxial wind turbine apparatus which includes a pair of rearward-mounted, spring-loaded fins to orient the air inlet opening to face the direction of the oncoming wind and close a damper panel or shutter array at the air inlet opening during very high wind conditions. Thereby, the pair of rearward-mounted, spring-loaded fins stabilizes the apparatus during strong ambient wind conditions and minimizes damage to the rotating turbine wheel in the presence of a strong wind.

19 Claims, 5 Drawing Sheets

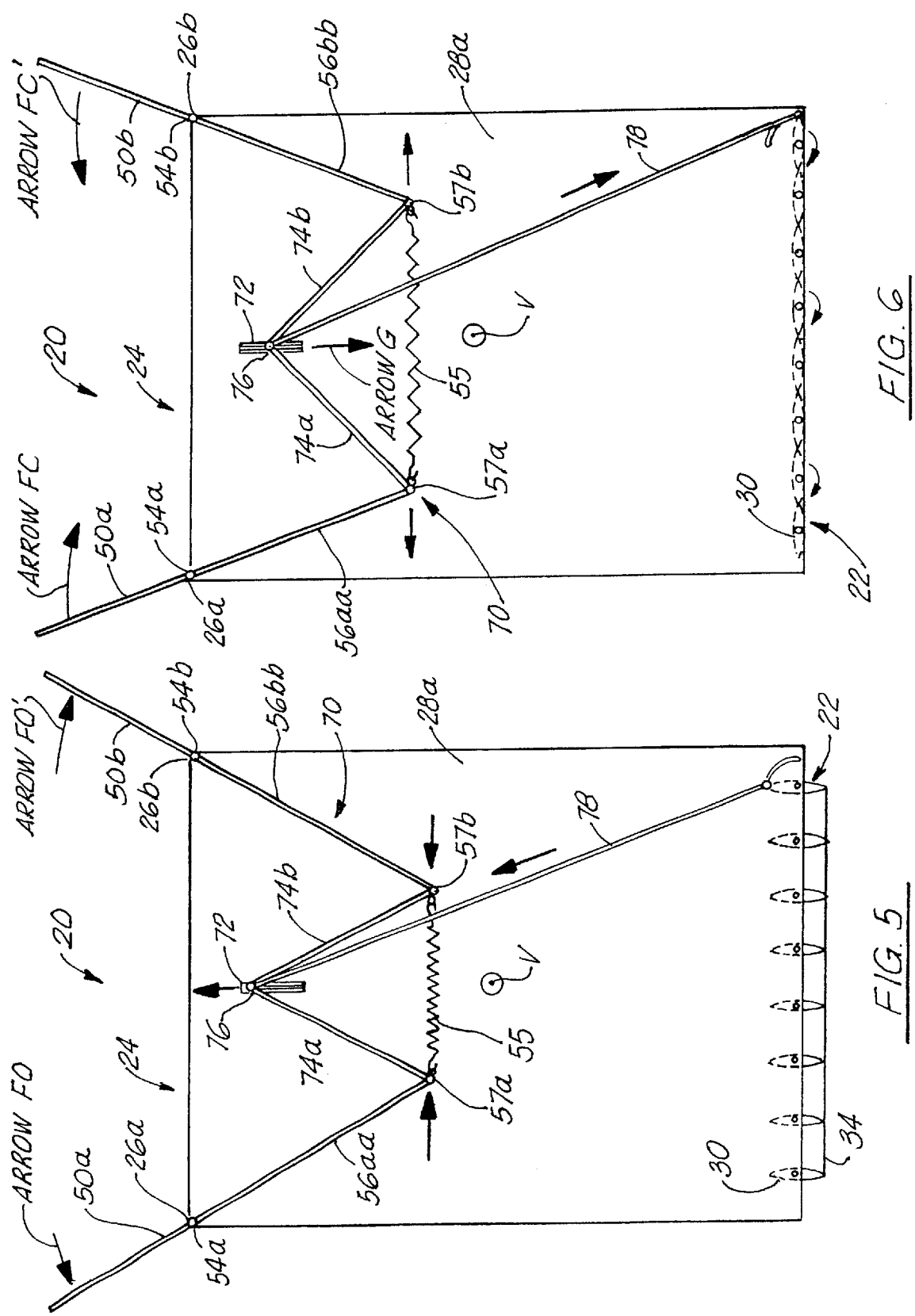

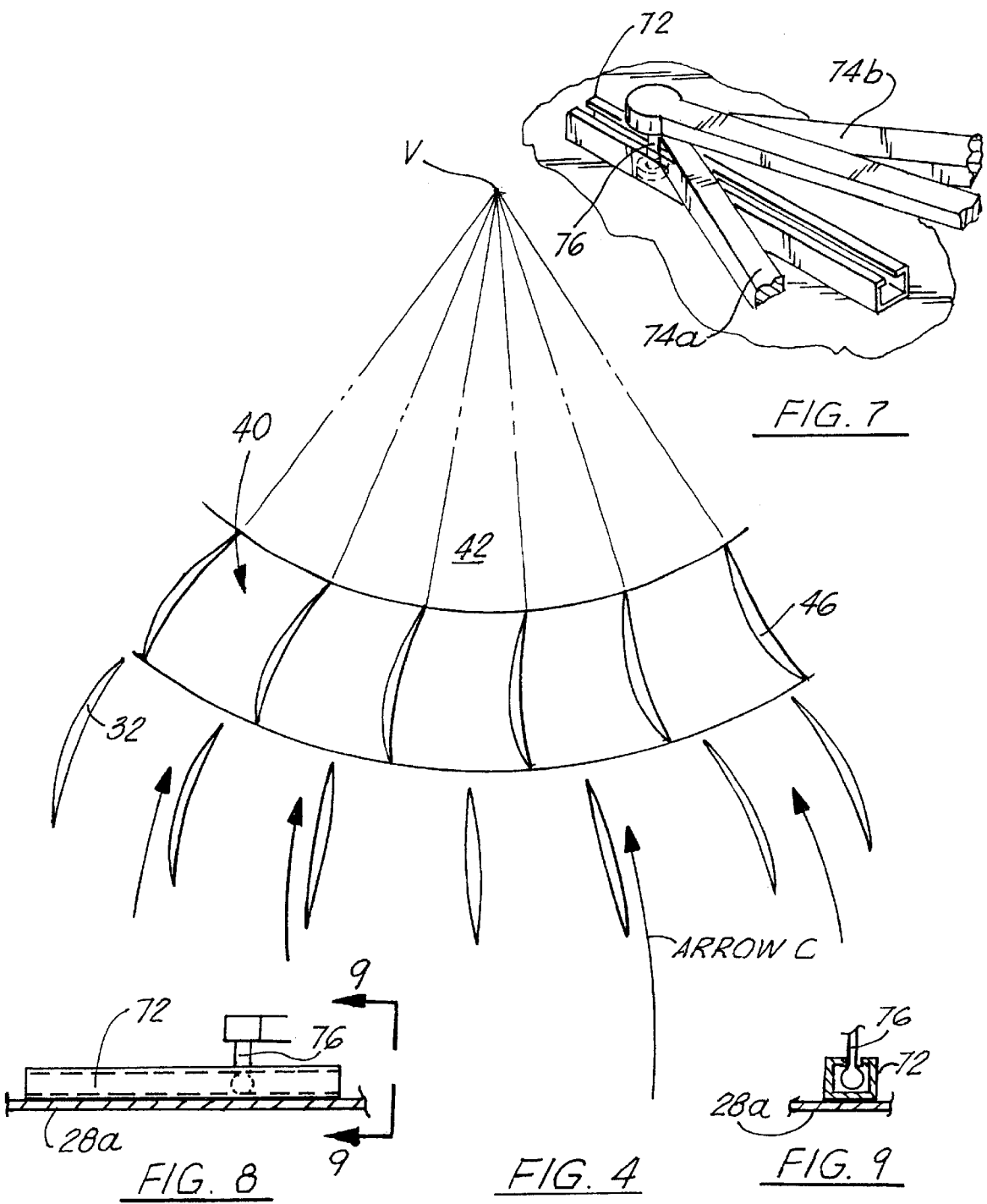

COAXIAL WIND TURBINE APPARATUS HAVING A CLOSEABLE AIR INLET OPENING

BACKGROUND OF THE INVENTION

1. Field of the Invention

The present invention relates to coaxial wind turbines and, more particularly, to a coaxial wind turbine apparatus which includes a pair of rearward-mounted, spring-loaded fins to orient the air inlet opening to face the direction of the oncoming wind and close a damper panel or shutter array at the air inlet opening during very high wind conditions.

2. General Background

Generators which are wind powered via wind turbines are very well known. In operation, the wind turbines are typically designed to orient the air inlet in the direction of the wind harness the wind velocity within the wind turbine. As can be appreciated, during very high wind conditions, the rotation of the turbine wheel increases as the wind velocity increases. As a result, the gears rotating the turbine wheel may malfunction in very high wind conditions.

Several apparatuses have been patented which are aimed at wind turbines.

U.S. Pat. No. 6,191,496 issued to D. M. Elder, entitled "WIND TURBINE SYSTEM" discloses a coaxial wind turbine having a vertical shaft turned by rotor blades. The wind is compressed and directed to the rotor-blades by numerous stator blades. The wind attempting to enter the turbine against the prevailing wind direction and, hence, against the direction of the rotors is deflected by a top shield.

U.S. Pat. No. 4,084,918 issued to Turbomachines, Inc., of Irvine, Calif., on the application of V. M. Pavlecka, entitled "WIND MOTOR ROTOR HAVING SUBSTANTIALLY CONSTANT PRESSURE AND RELATIVE VELOCITY FOR AIRFLOW THERETHROUGH" discloses a coaxial wind turbine including a stator having a plurality of vertical blades which direct the wind into a diffuser having vertical vanes that direct the wind downstream to an outlet. A pair of fins are mounted on the rear end of the turbine. The fins cause the wind motor to act as a weather vane and therefore face into the oncoming wind.

U.S. Pat. No. 5,332,354 issued to J. S. Lamont, entitled "WIND TURBINE APPARATUS" discloses a coaxial wind turbine having an enclosure which is rotatable about the vertical axis with closeable inlet and outlet openings. The turbine includes an internal rotor carrying blades and a guidance means. The guidance means has fins to compensate for unbalanced forces and to properly orient the inlet opening with ambient wind direction.

U.S. Pat. No. 4,834,610 issued F. W. Bond, III, entitled "WIND PROCESSING AIR TURBINE, AND METHOD OF CONSTRUCTING AND UTILIZING SAME"; U.S. Pat. No. 3,994,621 issued to T. Bogie, entitled "WINDMILL"; and, U.S. Pat. No. 5,664,418 issued to V. Walters, entitle "WHIRL-WIND VERTICAL AXIS WIND AND WATER TURBINE", all disclose coaxial wind turbines rotatable about a vertical axis.

SUMMARY OF THE PRESENT INVENTION

The preferred embodiment of coaxial wind turbine apparatus of the present invention solves the aforementioned problems in a straight forward and simple manner.

Broadly, the present invention contemplates a coaxial wind turbine apparatus which includes a pair of rearward-mounted, spring-loaded fins to orient the air inlet opening to face the direction of the oncoming wind and close a damper panel or shutter array at the air inlet opening during very high wind conditions.

More specifically, the present invention further contemplates a coaxial wind turbine apparatus comprising: a rotatable turbine housing having an air inlet opening and an air outlet opening; a rotatable turbine wheel housed in said turbine housing between the air inlet opening and the air outlet opening; a damper panel array coupled to the air inlet opening; and, a pair of spring-loaded fins mounted at a rear of said turbine housing and linked to the damper panel array wherein the pair of spring-loaded fins orients the air inlet opening to face oncoming wind and closes the damper panel array during strong ambient wind conditions.

The present invention further contemplates a method of creating wind turbine energy comprising the steps of: rotating a wind inlet opening of a wind turbine in a direction of oncoming ambient wind; detecting a strong oncoming ambient wind with pair of spring-loaded fins; and, closing said wind inlet when said strong oncoming ambient wind is detected.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 4 illustrates the damper panels in relation to the turbine wheel vanes;

FIG. 5 illustrates the orientation of the pair of vertical fins when the damper panels are opened;

FIG. 6 illustrates the orientation of the pair of vertical fins when the damper panels are closed;

FIG. 7 illustrates channel slide for connecting the pair of vertical fins;

FIG. 8 illustrates a side view of the channel slide; and,

FIG. 9 illustrates an end view of the channel slide.

DETAILED DESCRIPTION OF THE PREFERRED EMBODIMENT

Figure 1:
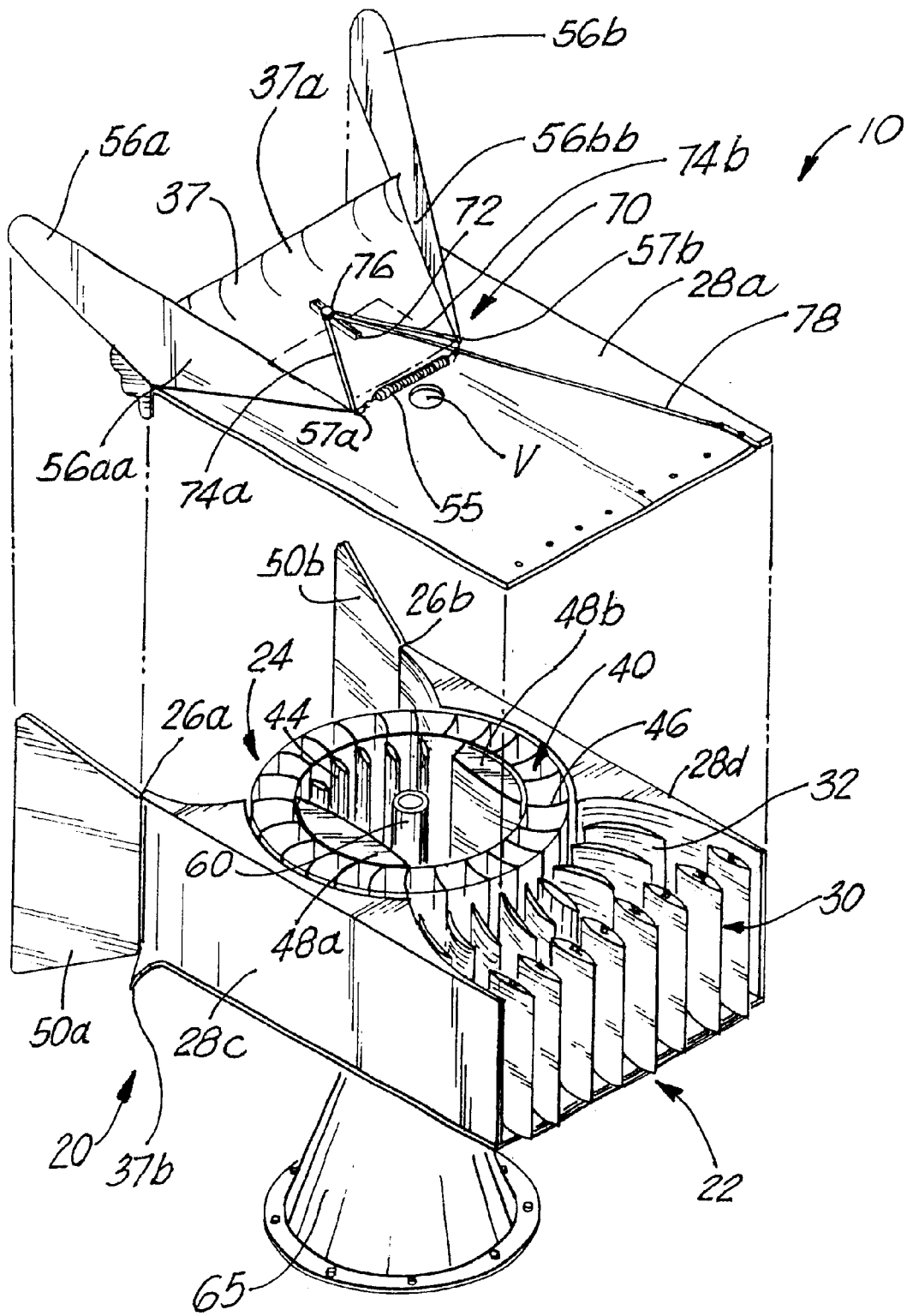
FIG. 1 illustrates a partially exploded view of the coaxial wind turbine apparatus of the present invention.

Referring now to the drawings and in particular FIGS. 1–4, the coaxial wind turbine apparatus of the present invention is generally referenced by the numeral 10. The coaxial wind turbine apparatus 10 of the present invention comprises a rotatable enclosure or wind collecting housing 20 having an air inlet opening 22 closeable by vertical damper panels 30 and an air outlet opening 24, rotating turbine wheel 40 having a plurality of vertical directional or rotor vanes 46 and a pair of spring-loaded vertical fins 50a and 50b, all for generating maximum rotational mechanical energy from a wind flow stream in the direction of ARROWS A.

Figure 3:
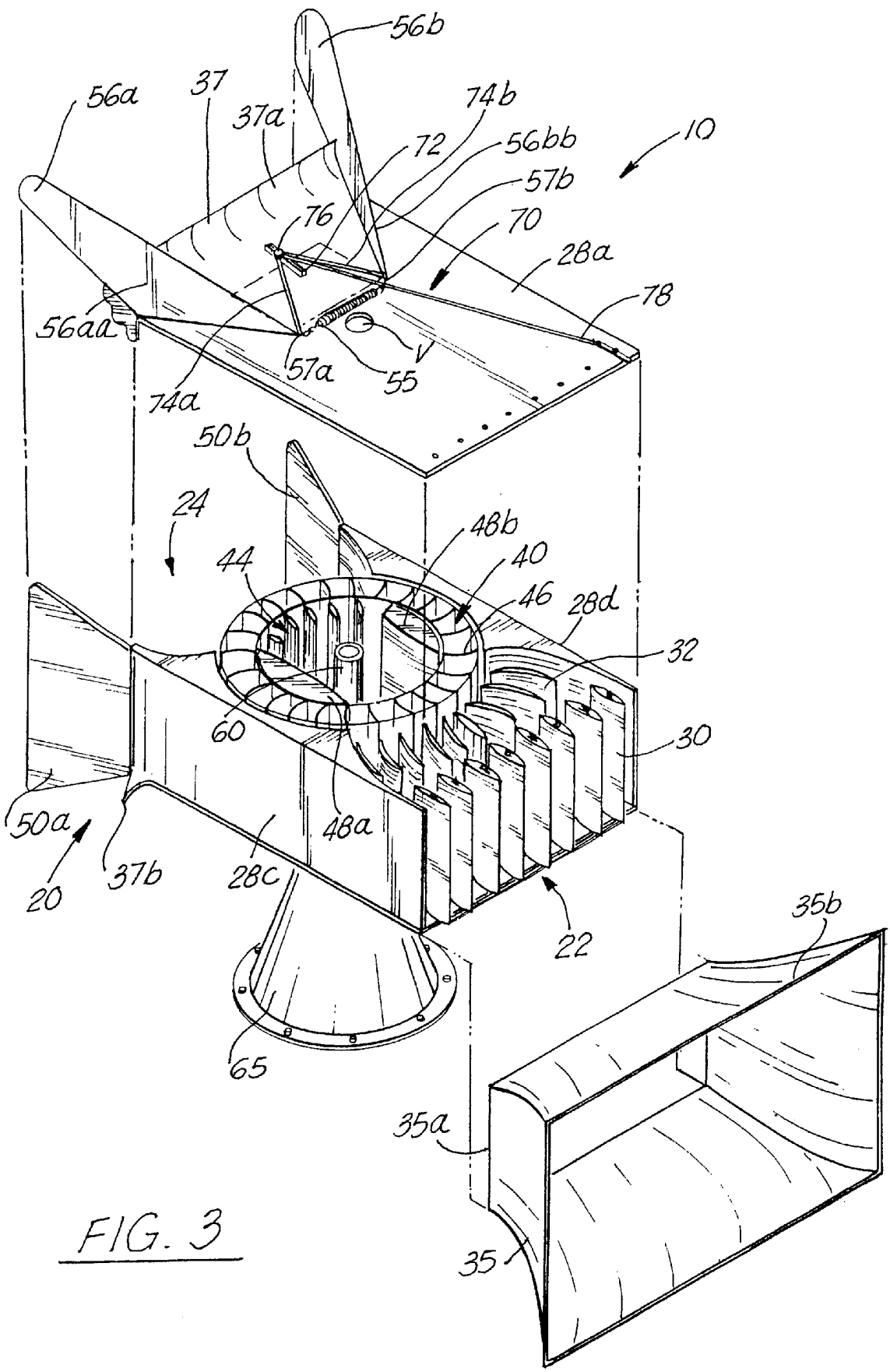
FIG. 3 illustrates an exploded view of the coaxial wind turbine apparatus of the present invention.

As best seen in FIGS. 1 and 3, the rotatable enclosure or wind collecting housing 20 includes top and bottom surfaces 28a and 28b and the vertical side walls 28c and 28d. The air inlet opening 22 is located at the front of the rotatable enclosure or wind collecting housing 20 while the air outlet opening 24 is located rearward. The rotating turbine wheel 40 is mounted substantially in the center of the rotatable enclosure or wind collecting housing 20 and is rotated about the vertical axis V defined by spindle 60.

Figure 2:
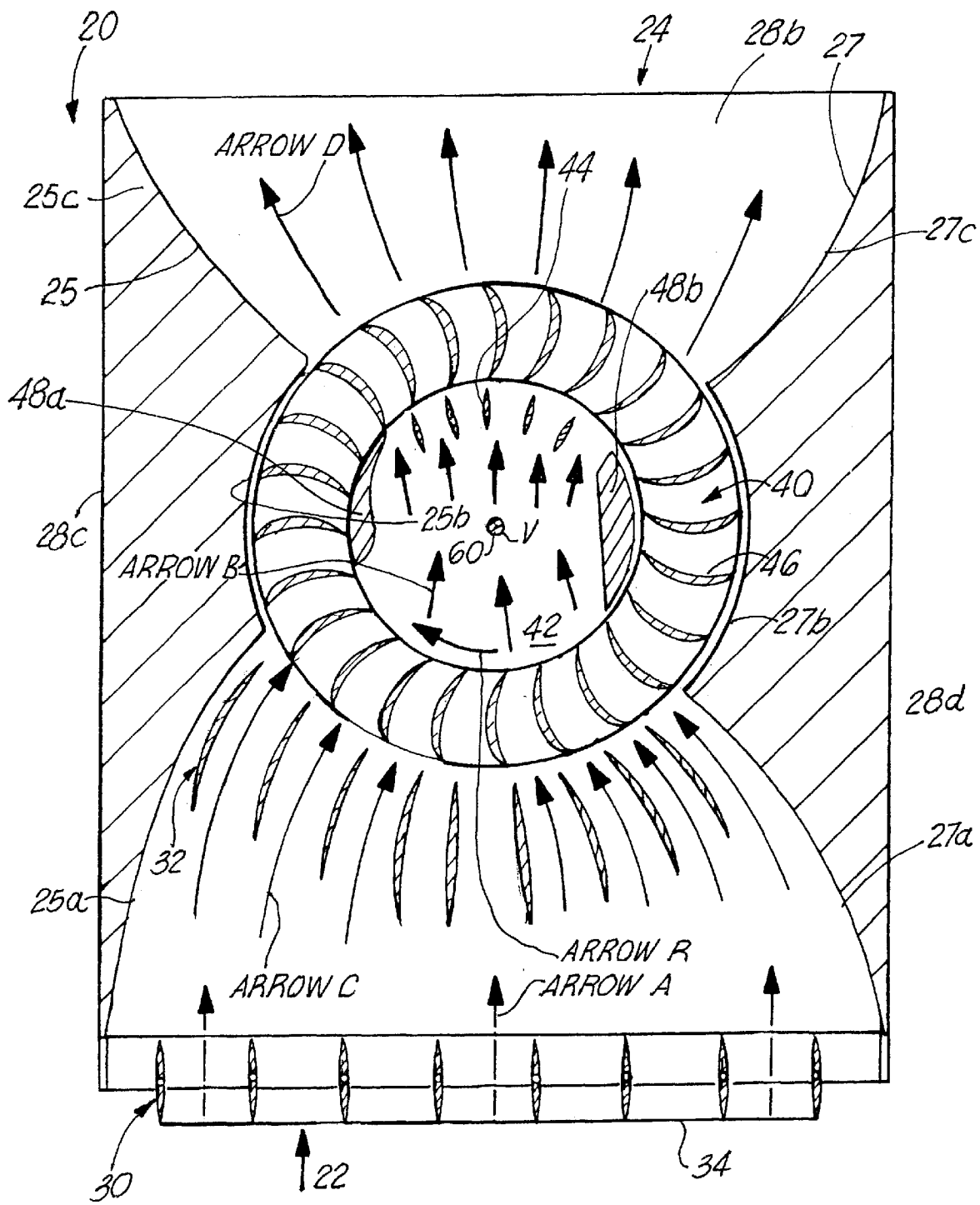
FIG. 2 illustrates a top view of the coaxial wind turbine apparatus of the present invention with the top of the wind collecting housing removed.

The air inlet opening 22 and the air outlet opening 24 are funnel-shaped, as best seen in FIG. 2. In other words, the air inlet opening 22 decreases in size front to back while the air outlet opening 24 increases in size front to back. The funnel-shaped air inlet opening 22 and the funnel-shaped air outlet opening 24 are created by curved side-wall panels 25 and 27 which project from the vertical side walls 28c and 28d, respectively, extending from air inlet opening 22 and the air outlet opening 24. The curved side-wall panels 25 and 27 on the inlet side include front end surfaces 25a and 27a, respectively, which have an increasing slope to narrow the air inlet opening 22. The curved side-wall panels 25 and 27 include center concaved sections 25b and 27b, respectively, which approximate a portion of the curvature of the rotating turbine wheel 40. Furthermore, the curved side-wall panels 25 and 27 on the outlet side include rear end surfaces 25c and 27c, respectively, which have a decreasing slope to expand the air outlet opening 24.

The funnel-shaped air inlet opening 22 extends inward in close proximity to the rotating turbine wheel 40 to increase the wind velocity and directs such wind (ARROWS C) to vanes 46 on the inlet side. The funnel-shaped air outlet opening 24 decreases exiting wind velocity and directs such exiting wind (ARROWS D) away from vanes 46 on the outlet side.

Referring still to the air inlet opening 22 and the air outlet opening 24, the rotatable enclosure or wind collecting housing 20 further includes an funnel-shaped inlet shroud portion 35 and a funnel-shaped outlet shroud portion 37. The funnel-shaped inlet shroud portion 35 includes a rear end 35a which is dimensioned to approximate the perimeter of the air inlet opening 22 and a front end 35b which gradually flares outward. The outlet shroud portion 37 includes top and bottom flared sections 37a and 37b which are integrated with and flares rearward from the top and bottom surfaces 28a and 28b, respectively.

The rotatable enclosure or wind collecting housing 20 is rotatably supported upon a support base 65 which may be elevated above the ground. The rotatable enclosure or wind collecting housing 20 rotates relative to support base 65 about vertical axis V on spindle 60 (thus coaxially with turbine wheel 40) to turn or position the rotatable enclosure or wind collecting housing 20 as desired depending upon the ambient wind condition.

The inlet side of the air inlet opening 22 has a damper panel array including a plurality of spaced-apart vertical damper panels or shutters 30 pivotally coupled to the top and bottom surfaces 28a and 28b. The spaced-apart vertical damper panels or shutters 30 are generally elliptically-shaped to permit for enhanced aerodynamics. The plurality of spaced-apart vertical damper panels or shutters 30 are linked together via panel linking rod 34 and are operated or rotated in unison from an open state (FIG. 5) to a closed state (FIG. 6). In the open state, the plurality of spaced-apart vertical damper panels or shutters 30 are essentially parallelly aligned with a gap between any two adjacent vertical damper panels or shutters 30. In the closed state, the plurality of spaced-apart vertical damper panels or shutters 30 rotated approximately 90 degrees so that there is essentially no gap between any two adjacent vertical damper panels or shutters 30. Thereby, the air inlet opening 22 is essentially closed to the flow of the wind.

The air inlet opening 22 further includes a plurality of air-directing vanes 32 which are aerodynamically contoured. The air-direction vanes 32 are stationary and are positioned in the flow of the wind between the vertical damper panels or shutters 30 and the rotating turbine wheel 40. In the exemplary embodiment, the aerodynamic contour of each air-directing vane 32 is essentially crescent-moon shaped. Furthermore, in the preferred embodiment, the number of air-directing vanes 32 is greater than the number of vertical directional or rotor vanes 46 at the rear end of the funnel-shaped air inlet opening 22, as best seen in FIG. 4.

In the exemplary embodiment, the plurality of vertical directional or rotor vanes 46 of the rotating turbine wheel 40 are generally crescent-moon shaped and are spaced-apart in circumferentially to define a wheel. The spacing between the vertical directional or rotor vanes 46 permits wind to flow therethrough. Wind flowing in the center 42 of the rotating turbine wheel 40 engages an array of air-directing vanes 44 positioned rearward (outlet side) of the center 42. The center 42 of the rotating turbine wheel 40 further includes two internal baffles 48a and 48b having minimal intrusion in the center 42 of the rotating turbine wheel 40. However, the baffles 48a and 48b direct wind (ARROW B) within the center 42 from the inlet side to the outlet side of the rotating turbine wheel 40.

Referring now to FIGS. 5–9, the spring-loaded vertical fins 50a and 50b are pivotally coupled at pivots 54a and 54b, respectively, to the rear end of the rotational enclosure or wind collector 20 or air outlet opening 24. In the exemplary embodiment, the spring-loaded vertical fins 50a and 50b are pivotally coupled at or near the rear corners 26a and 26b, respectively, of the rotational enclosure or wind collector 20. The spring-loaded vertical fins 50a and 50b radiate rearward from the rotational enclosure or wind collector 20 and flare in surface area top to bottom in a triangularly-shaped fashion. Nevertheless, other configurations may be employed.

The flared top portions 56a and 56b of the spring-loaded vertical fins 50a and 50b, respectively, extends over the height of the top surface 28a. Integrated with the flared top portions 56a and 56b are fin directing portion 56aa and 56bb, respectively, that slope over (on top of) the top surface 28a. The flared top portions 56a and 56b are angled (radiate outward and angularly) from the corners 26a and 26b. The fin directing portion 56aa and 56bb which are extensions of the flared top portions 56a and 56b substantially linearly track the angled radial profile over the top surface 28a of the rotational enclosure or wind collector 20. The fin directing portions 56aa and 56bb are coupled to pivots 54a and 54b at a level which is above the top surface 28a. The distal ends 57a and 57b of the fin directing portions 56aa and 56bb are coupled together via spring member 55.

The spring-loaded vertical fins 50a and 50b control the open state (FIG. 5) and the closed state (FIG. 6) of the damper panel array via linkage assembly 70. Linkage assembly 70 includes a channel guide 72 affixed to the top surface 28a between the fin directing portions 56aa and 56bb. The distal ends 57a and 57b of the fin directing portions 56aa and 56bb are coupled to the channel guide 72 via fin linking arms 74a and 74b, respectively, via slide post 76 slidably coupled in the channel guide 72. The linkage assembly 70 further includes linkage arm 78 coupled to the slide post 76 and to the panel linking rod 34 linking the vertical damper panels or shutters 30.

Referring now to FIG. 5, in operation, the spring-loaded vertical fins 50a and 50b are spring biased via spring member 55 to control and maintain the vertical damper panels or shutters 30 in the open state, as best seen in FIG. 5, under normal, low and high ambient wind conditions. The force exerted by spring member 55 at the distal ends 57a and 57b of the fin directing portions 56aa and 56bb serves to create forces in the direction of ARROWS Fo and Fo'. Thereby, spacing between the rear ends of the spring-loaded vertical fins 50a and 50b remains essentially at its maximum.

Referring now to FIG. 6, in the presence of very high or strong ambient wind conditions, the wind velocity creates a strong force on the spring-loaded vertical fins 50a and 50b. The strong force creates a force in the direction of ARROWS Fc and Fc' overpowering the force exerted by spring member 55 at the distal ends 57a and 57b of the fin directing portions 56aa and 56bb. Thereby, spacing between the rear ends of the spring-loaded vertical fins 50a and 50b is reduced and spacing between the distal ends 57a and-57b increases. As, the spacing between the distal ends 57a and 57b increases the fin linking arms 74a and 74b, respectively, slide via slide post 76 along the channel guide 72, in the direction of ARROW G. The linkage arm 78 also coupled to the slide post 76 and to the panel linking rod 34 closes the vertical damper panels or shutters 30.

As can be appreciated, the spring-loaded vertical fins 50a and 50b serve to stabilize the apparatus 10 during very high wind conditions. A linkage arm 78 connects the spring-loaded vertical fins 50a and 50b to damper panels 30 to open and close these damper panels or shutters 30 depending on ambient wind condition.

In operation, the rotational enclosure or wind collector 20 is automatically oriented in the direction of the wind and receives wind flow in the direction of ARROWS A through the air inlet opening 22 when the vertical damper panels or shutters 30 are in the open state. The funnel-shaped air inlet opening 22 directs or feeds the wind to force accelerating air (ARROWS C) into the vertical directional or rotor vanes 46 which due to their curvature cause rotating turbine wheel 40 to rotate in the direction of ARROW R (about the vertical axis V). As is well known, the rotation of the turbine 40 is transferred to an electric generator (NOT SHOWN).

Any minor change in the wind's direction or strength acts not only on the vertical directional or rotor vanes 46 but also on the spring-loaded vertical fins 50a and 50b which stabilizes the apparatus 10 to ensure that damper panels 30 stay facing into the wind in the "open" position or state of FIGS. 1 and 5. If the wind should become too strong, then the spring-loaded vertical fins 50a and 50b will pivot inward causing the vertical damper panels or shutters 30 to move to the "closed" position, as best seen in FIG. 6, so that apparatus 10 is deactivated.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A coaxial wind turbine apparatus comprising:
    a rotatable turbine housing having an air inlet opening and an air outlet opening;
    a rotatable turbine wheel housed in said turbine housing between the air inlet opening and the air outlet opening;
    a damper panel array coupled to the air inlet opening; and,
    a pair of spring-loaded fins mounted at a rear of said turbine housing and linked to the damper panel array wherein the pair of spring-loaded fins orients the air inlet opening to face oncoming wind and closes the damper panel array during strong ambient wind conditions.

2. The apparatus of claim 1, wherein the pair of spring-loaded fins are spring biased to maintain the damper panel array open during normal ambient wind conditions.

3. The apparatus of claim 1, further comprising:
    a linking assembly, said linking assembly includes:
        a channel guide affixed to a top surface of the rotatable turbine housing;
        a slide post slidably coupled in said channel guide;
        a pair of fin linking arms each of which is coupled to a respective one of the spring-loaded fins and to said slide post; and,
        a linking arm coupled to the slide post and said damper panel array.

4. The apparatus of claim 3, wherein as a strong wind exerts a force on the pair of spring-loaded fins, each-fin of the pair of spring-loaded fins moves toward the other, the pair of fin linking arms cause the slide post to slide within the channel guide, causing the linking arm close the damper panel array.

5. The apparatus of claim 4, wherein the pair of spring-loaded fins are spring biased to open the damper panel array in the absence of the strong wind.

6. The apparatus of claim 1, wherein the rotatable turbine wheel comprises:
    a plurality of vertical directional or rotor vanes; and, further comprising:
        baffles in a center of the rotatable turbine wheel; and, stationary vanes rearward of a center of said turbine wheel.

7. The apparatus of claim 6, wherein said front air inlet opening comprises:
    a plurality of stationary vanes positioned between the damper panel array and the rotatable turbine wheel.

8. The apparatus of claim 6, wherein said rotatable turbine housing further comprises:
    a funnel-shaped inlet shroud coupled to the air inlet opening.

9. A coaxial wind turbine apparatus comprising:
    means for housing a wind turbine having means for receiving oncoming wind and means for exiting wind;
    means for closing the wind receiving means; and,
    means for stabilizing the housing means, orienting said wind receiving means to face the oncoming wind and closing the wind receiving closing means during strong ambient wind conditions, said stabilizing, orienting and closing means including a pair of spring-loaded fins spring biased to maintain the wind receiving closing means open during normal ambient wind conditions.

10. The apparatus of claim 9, further comprising:
    means for linking the wind receiving closing means and the stabilizing, orienting and closing means assembly, said linking means includes:
        a channel guide affixed to a top surface of said housing means;
        a slide post slidably coupled in said channel guide;
        a pair of fin linking arms each of which is coupled to a respective one of the spring-loaded fins and to said slide post; and, a linking arm coupled to the slide post and said the wind receiving closing means.

11. The apparatus of claim 10, wherein as a strong wind exerts a force on the pair of spring-loaded fins, each fin of the pair of spring-loaded fins moves toward the other, the pair of fin linking arms cause the slide post to slide within the channel guide, causing the linking arm close the wind receiving closing means.

12. The apparatus of claim 11, wherein the pair of spring-loaded fins are spring biased to open the wind receiving closing means damper panel array in the absence of the strong wind.

13. The apparatus of claim 9, wherein the wind turbine comprises:

a rotatable turbine wheel having a plurality of vertical directional or rotor vanes;

baffles in a center of the rotatable turbine wheel; and, stationary vanes rearward of a center of said turbine wheel.

14. The apparatus of claim 13, wherein said wind receiving means further comprises:

a plurality of stationary vanes positioned between the wind receiving closing means and the rotatable turbine wheel.

15. The apparatus of claim 14, wherein said housing means further comprises:

a funnel-shaped inlet shroud coupled to the wind receiving means.

16. A method creating wind turbine energy comprising the-steps of:

rotating a wind inlet opening of a wind turbine in a direction of oncoming ambient wind;

detecting a strong oncoming ambient wind with pair of spring-loaded fins;

closing said wind inlet when said strong oncoming ambient wind is detected.

17. The method of claim 16, further comprising the steps of:

detecting when the strong ambient wind has ceased; and, automatically, opening the wind inlet open when the strong ambient wind has ceased.

18. The method of claim 16, further comprising the step of:

spring biasing said pair of spring-loaded fins spring biased to maintain the wind inlet open during normal ambient wind conditions.

19. The method of claim 18, wherein the closing step comprises the step of:

closing a damper panel array at an input of said wind inlet.

* * * * *